(12) United States Patent
Washington

(10) Patent No.: US 7,549,692 B2
(45) Date of Patent: Jun. 23, 2009

(54) RAMP ASSEMBLY FOR A VEHICLE TAILGATE

(76) Inventor: DerRon K. Washington, 4912 Invicta Dr., Louisville, KY (US) 40216

( * ) Notice: Subject to any disclaimer, the term of this patent is extended or adjusted under 35 U.S.C. 154(b) by 2 days.

(21) Appl. No.: 11/980,362

(22) Filed: Oct. 31, 2007

(65) Prior Publication Data

US 2009/0108614 A1 Apr. 30, 2009

(51) Int. Cl.
B62D 25/00 (2006.01)
(52) U.S. Cl. .......................................... 296/61; 296/62
(58) Field of Classification Search ................ 296/61, 296/50, 57.1, 62, 51
See application file for complete search history.

(56) References Cited

U.S. PATENT DOCUMENTS

| | | | | |
|---|---|---|---|---|
| 3,642,156 A * | 2/1972 | Stenson | ........................ | 296/61 |
| 4,020,957 A | 5/1977 | Wren | | |
| 4,081,091 A * | 3/1978 | Thorley | ........................ | 296/62 |
| 4,624,619 A | 11/1986 | Uher | | |
| 4,628,561 A * | 12/1986 | Kushniryk | ................. | 14/69.5 |
| 4,900,217 A * | 2/1990 | Nelson | ...................... | 296/26.1 |
| 5,077,852 A * | 1/1992 | Karlsson | ..................... | 14/69.5 |
| 5,205,603 A * | 4/1993 | Burdette, Jr. | ................. | 296/62 |
| 5,244,335 A * | 9/1993 | Johns | .......................... | 296/61 |
| 5,273,335 A * | 12/1993 | Belnap et al. | ................. | 296/61 |
| 5,312,149 A * | 5/1994 | Boone | ......................... | 296/61 |
| 5,597,195 A | 1/1997 | Meek | | |
| 5,795,125 A | 8/1998 | Walkden | | |
| 5,803,523 A * | 9/1998 | Clark et al. | ................. | 296/26.1 |
| 5,813,071 A * | 9/1998 | Breslin et al. | ................ | 14/71.1 |
| 5,907,276 A | 5/1999 | Lance | | |
| 6,345,691 B1 * | 2/2002 | Ruiz | .......................... | 182/195 |
| 6,364,391 B1 * | 4/2002 | Everett | ........................ | 296/51 |
| 6,447,040 B1 | 9/2002 | Young | | |
| 6,454,338 B1 * | 9/2002 | Glickman et al. | ............. | 296/61 |
| 6,484,344 B1 * | 11/2002 | Cooper | ....................... | 14/71.1 |
| 6,834,903 B2 * | 12/2004 | Harper et al. | .................. | 296/61 |
| 6,913,305 B1 * | 7/2005 | Kern et al. | .................... | 296/61 |
| 6,991,277 B1 * | 1/2006 | Esler | .......................... | 296/50 |
| 7,284,781 B2 * | 10/2007 | Grant | .......................... | 296/61 |
| 7,302,725 B2 * | 12/2007 | Thygesen | ................... | 14/69.5 |
| 7,488,025 B1 * | 2/2009 | Roberson | ..................... | 296/61 |
| 2006/0123568 A1 * | 6/2006 | Zhang | ........................ | 14/69.5 |

* cited by examiner

*Primary Examiner*—Kiran B. Patel
(74) *Attorney, Agent, or Firm*—Theresa M. Seal

(57) ABSTRACT

A compact ramp and tailgate system for a vehicle tailgate includes a tailgate having an interior hollow cavity for collapsible storage therein of a pair of ramps that are also telescopically extendable therefrom for loading and unloading heavy equipment into and off the bed of the vehicle such as a pickup truck with each ramp mounted to a locking hinge that allows the ramps to pivot up to ninety degrees and each ramp composed of at least three ramp members of decreasing size starting from the largest ramp members that are pivotally interconnected to the locking hinges. The ramps are independently pivotable and slidably adjustable left and right relative to the tailgate and the longitudinal extension of the vehicle for properly aligning the ramps with respect to the wheels, rollers, casters, etc., of the equipment to be on loaded and off loaded.

5 Claims, 3 Drawing Sheets

RAMP ASSEMBLY FOR A VEHICLE TAILGATE

FIELD OF THE INVENTION

The present invention pertains to loading and off loading ramps for automotive vehicles, and more particularly pertains to a ramp assembly integral with the tailgate of the automotive vehicle.

BACKGROUND OF THE INVENTION

The moving, hauling, and transporting of heavy equipment, items and recreational vehicles is a common occurrence in today's society. Such equipment, items, and recreational vehicles can include wheelchairs, furniture with casters, ATVs, roto tillers, lawn tractors, heavy duty mowers, motorcycles, dirt bikes, skidoos, etc. Furthermore, such heavy equipment is most often loaded onto the beds of pickup trucks and, less often, into the storage compartments of SUVs and minivans.

Typically, the loading and unloading of the equipment is accomplished in one of two ways: either one or more individuals manually lifts up the piece of equipment, for example, and with difficulty maneuvers the piece of equipment into the storage compartment or onto the bed of the vehicle; or makeshift ramps, such as a pair of two by eights or a pair of two by tens are propped against the rear ledge or open tailgate of the vehicle. The piece of equipment is then pushed up the ramp and pushed into the rear storage compartment or on the bed of the vehicle.

The dangers and difficulties of loading and unloading such equipment are obvious. Lifting an ATV or a lawn tractor on and off the bed of a vehicle is hard, dangerous, and unsafe. Serious injury could result to all members of a party involved in lifting the equipment should even one member of the party lose his grip on the equipment. In addition, the above-mentioned types of equipment are bulky, awkward, and not even designed to be lifted, loaded, and unloaded from one surface to another surface having a different elevation from the first surface.

The dangers and difficulties are not avoided by using makeshift planks as ramps. The individuals still must push with great exertion the piece of equipment up the planks all the while maintaining the alignment of the wheels, rollers, casters, or skids with the planks so that the piece of equipment doesn't roll off the planks. In addition, in order to unload the piece of equipment, the moving parting must first align the piece of equipment with the planks, and then simultaneously restrain and allow the downward sliding or rolling motion of the piece of equipment Again, should the piece of equipment roll off the planks or get away from the moving party, serious damage to the equipment and serious injury to the members of the moving party could occur. In view of the above, there is a definite need for a more secure, convenient, safe, and solid system or assembly for loading and unloading all types of heavy, awkward equipment on and off of transport and hauling vehicles.

Thus, the prior art discloses a variety of ramp assemblies for pickup trucks, trucks, and vehicles in general.

For example, the Wren patent (U.S. Pat. No. 4,020,957) discloses a detachable truck bed extension and loading ramp that includes a base plate and foldable upper and lower sections that provide a truck bed extension.

The Uher patent (U.S. Pat. No. 4,624,619) discloses a retractable ramp assembly for pickup trucks that includes a built-in enclosure for a ramp with the ramp including front and rear sections hinged together with the front section resting upon the open tailgate and the rear section pivoted downward to the ground.

The Meek patent (U.S. Pat. No. 5,597,195) discloses a rampable tailgate that includes foldable members that nest within each other when the tailgate is in the closed disposition and extend one from another when the tailgate is pivoted downward for use.

The Walkden patent (U.S. Pat. No. 5,795,125) discloses a ramp assembly that includes a hollow platform assembly secured to the bed of a pickup truck with a sliding platform disposed within the platform assembly and which can be pulled out for use as a ramp.

The Lance patent (U.S. Pat. No. 5,907,276) discloses a vehicle ramp system that includes a ramp that is movable between a tailgate position and a ramp position with the ramp being constructed as a single piece or in sections.

The Young Sr. patent (U.S. Pat. No. 6,447,040 B1) discloses a combination tailgate/ramp wherein the tailgate is configured in the form of ramp members hingedly attached to each other and which are unfolded from each other thereby creating a ramp.

Nonetheless, despite the ingenuity of the above devices, there remains a need for an easy-to-use, easy to access ramp assembly of collapsible design that is integrally disposed within the vehicle tailgate when not in use and which is extended therefrom for use.

SUMMARY OF THE INVENTION

The present invention comprehends a compact ramp and tailgate system for an automotive vehicle such as a trailer truck, moving truck, pickup truck, and even SUVs and minivans that include a tailgate. The compact ramp and tailgate system can be included with the vehicle as a standard option or can be retrofitted to the vehicle or included as an aftermarket item. The compact ramp and tailgate system eliminates heavy lifting, improves safety, saves space on the vehicle, and provides an added convenience for vehicle owners, especially for the owners of pickup trucks.

The present invention comprehends a compact ramp and tailgate system that includes a tailgate for a vehicle with the tailgate being modified to include and form therein a hollow interior cavity substantially equal in size to the tailgate. The hollow interior cavity includes a rectangular opening located adjacent what would be the outer and upper end of the tailgate when the tailgate is in the closed disposition. Disposed within the hollow interior cavity, and secured to the inner surface of the rear sidewall of the tailgate that faces outward when the tailgate is closed, is a transverse guide channel that extends along the length of the inner surface of the rear sidewall. In addition, one pair of spaced-apart longitudinal guide channels is disposed within the interior hollow cavity and is aligned with the longitudinal extension of the vehicle (rear to front) when the tailgate is in the open disposition. The longitudinal guide channels connect to the transverse guide channel creating, in effect, a unitary track enclosed within the interior hollow cavity of the tailgate.

One pair of connection plates are mounted to the transverse guide channel with the connection plates being capable of slidable independent movement with respect to each other within the transverse guide channel. Moreover, the connection plates are also capable of slidable independent movement along the longitudinal guide channels. Thus, the connection plates are capable of independent slidable movement in two angular orientations or at right angles within the interior hollow cavity.

Attached to each connection plate is a hinge and each hinge is pivotally mounted to the respective connection plate. When the connection plates are slid along the longitudinal guide channels and withdrawn within the interior hollow cavity, the hinges slightly protrude from the rectangular opening formed at the upper end of the tailgate. Attached to each hinge is a ramp, and each ramp includes telescoping ramp members with each ramp preferably composed of three ramp members that telescope out from each other and nest within each other. The extension and retraction of each ramp can occur independent of the other ramp, and the ramp members can be more specifically denoted a first largest ramp member, a second ramp member of intermediate size, and a third smallest ramp member. The lengths or extensions of the ramps are adjustable to accommodate the terrain and the equipment being loaded or off-loaded, and both ramps are slidably adjustable left and right transverse to the tailgate and the longitudinal extension (rear to front) of the vehicle. Moreover, the hinges allow the ramps to pivot at least ninety degrees so that the ramps can be appropriately oriented relative to the ground surface.

It is an objective of the present invention to provide a compact ramp assembly for a vehicle tailgate wherein the ramp assembly is of a collapsible design and is safe, convenient, and versatile.

It is another objective of the present invention to provide a compact ramp assembly for a vehicle tailgate that replaces the use of unsteady planks that are leaned against the tailgate with a solid support ramp assembly available for use as desired.

It is still another objective of the present invention to provide a compact ramp assembly for a vehicle tailgate that ensures a safe and stable ascension into the bed and descension from the bed when loading or unloading heavy equipment thereby eliminating any chance of the equipment shifting or falling off the ramp assembly and causing injury or damage to the equipment or the individuals maneuvering the equipment.

It is yet another objective of the present invention to provide a compact ramp assembly for a vehicle tailgate that eliminates the need for manual lifting of heavy equipment on and off the bed of the vehicle or for calling upon others for assistance.

It is still yet a further objective of the present invention to provide a compact ramp assembly for a vehicle tailgate that allows one person to load and unload material and equipment on the vehicle bed for enhancing convenience and independence.

Yet another objective of the present invention is to provide a compact ramp assembly for a vehicle tailgate wherein the portable ramp assembly doesn't consume valuable storage space and doesn't shift and move around when stored and during vehicle movement.

Yet a further objective of the present invention is to provide a compact ramp assembly for a vehicle tailgate that enables heavy equipment such as lawn tractors, wheelchairs, loaded dollies, and four-wheel ATVs to be easily, safely, and conveniently moved off and on the bed of the vehicle.

These and other objects, features, and advantages will become apparent to those skilled in the art upon a perusal of the following detailed description read in conjunction with the accompanying drawing figures and appended claims.

DETAILED DESCRIPTION OF THE PREFERRED EMBODIMENT

Illustrated in FIGS. 1-5 is a compact telescoping ramp assembly 10 for a tailgate of an automotive vehicle that can include delivery trucks, flatbed hauling trucks, pickup trucks, SUVs, and minivans, with the telescoping ramp assembly especially adapted and suitable for pickup trucks, such as the representative pickup truck shown in FIGS. 1-5. The ramp assembly 10 is designed to facilitate the easy, safe, quick, and convenient loading and off loading of heavy equipment, such as lawn mowers, lawn tractors, furniture, wheelchairs, loaded dollies, and recreational equipment such as ATVs, motorbikes, skidoos, and jet skis from the bed or rear storage compartment of the automotive vehicle.

Figure 1:
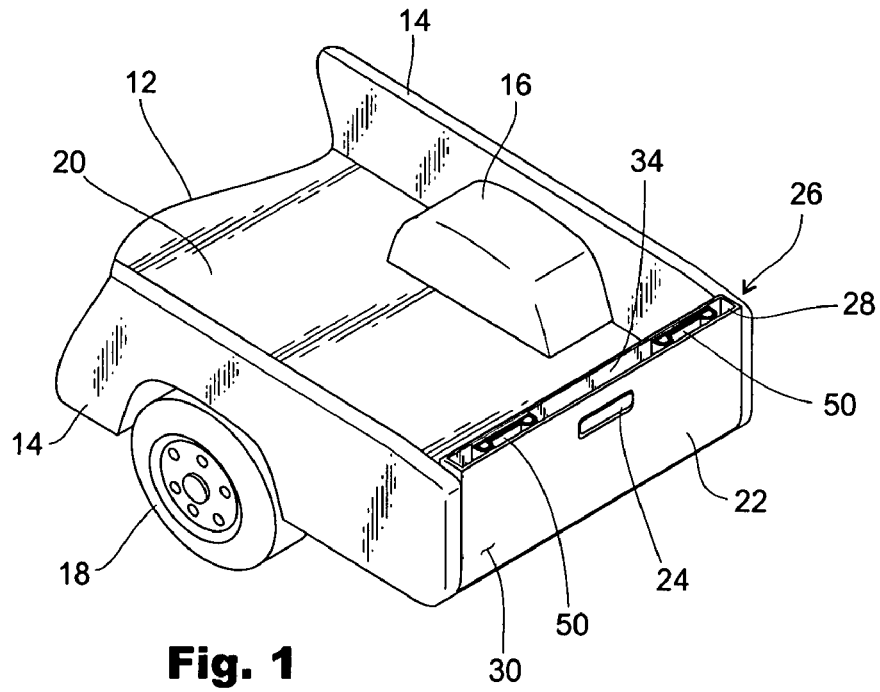
FIG. 1 is a perspective view of the compact ramp assembly for a vehicle tailgate illustrating the ramp assembly contained within the tailgate when the tailgate is in the non-use and closed position.

The pickup truck 12 of FIGS. 1-5 includes a pair of sidewalls 14, wheel wells 16 for each sidewall 14 that contain the rear wheels 18, a flat pickup truck bed 20, a pivotally openable and closable tailgate 22, and an exterior handle 24 for manually grasping to facilitate tailgate 22 opening and closure. The pickup truck 12 defines a transverse dimension or orientation that extends across the truck 12 from one sidewall 14 to the opposite sidewall 14, and a longitudinal extension that extends from the rear 26—the tailgate 22 and bed 20 area—to the front of the pickup truck 12. The tailgate 22 is pivotable between a fully closed position, as shown in FIG. 1, and a fully opened position as shown in FIGS. 2-5. The tailgate 22 is further defined by having an outer and upper end 28 and an exterior rear wall 30 and an interior rear wall 32.

Figure 2:
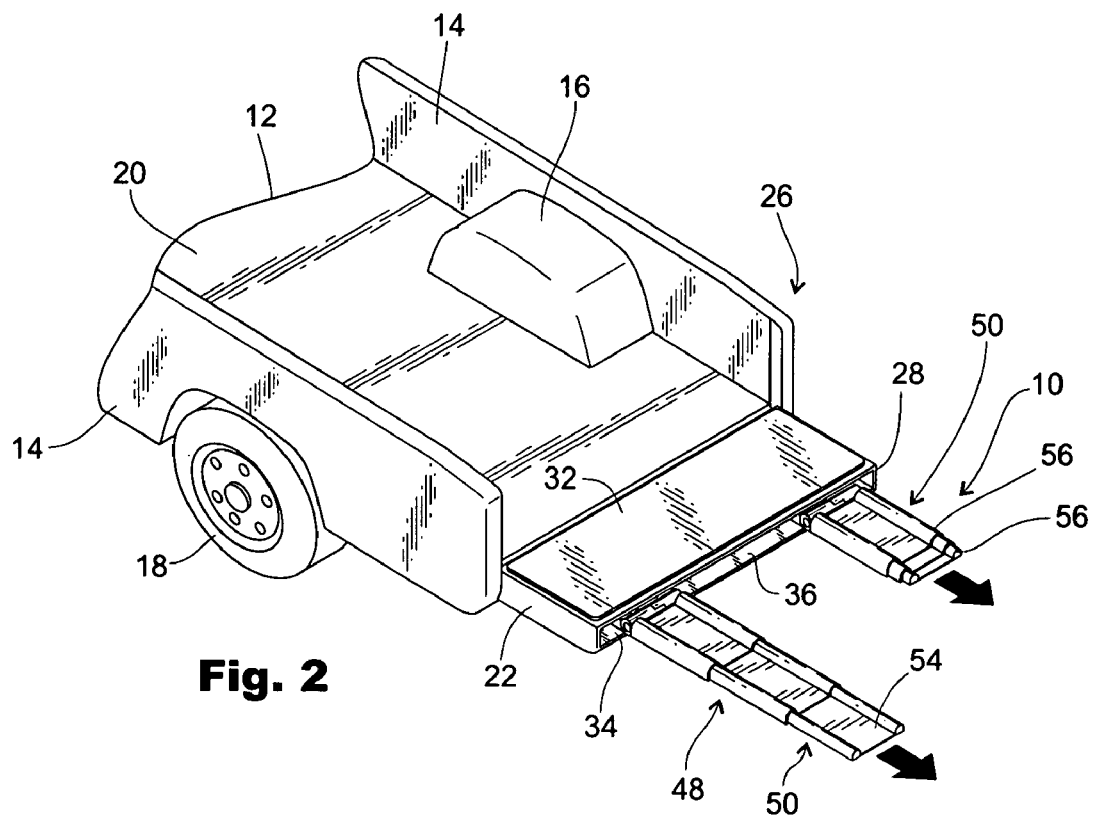
FIG. 2 is a perspective view of the compact ramp assembly for a vehicle tailgate illustrating the tailgate in the open position so that the ramp assembly can be accessed and extended for use.

As shown in FIGS. 1 and 2, the tailgate 22 is modified to create an interior hollow cavity 34 substantially equal in size to the rectangular-shaped tailgate 22. Disposed within the interior hollow cavity 34, and specifically mounted to the interior surface 36 of the exterior rear wall 30 is a unitary guide track 38. The unitary guide track 38 includes a transverse guide channel 40 that extends across the width of the tailgate 22 and a pair of longitudinal guide channels 42 that extend longitudinally within the tailgate 22, and which are connected to the transverse guide channel 40 to form the continuous unitary guide track 38. Mounted to the guide track 38 for slidable movement in both the transverse and longitudinal guide channels 40 and 42 is a pair of connection plates 44. The connection plates 44 are sized so that they fit within the interior hollow cavity 34 of the tailgate 22 with sufficient clearance for slidable movement along the guide channels 40 and 42. As indicated in FIG. 5, the connection plates 44 are independently slidable in both the transverse direction (sidewall 14 to sidewall 14) and the longitudinal direction (rear to front) relative to the pickup truck 12 for properly extending, aligning, and withdrawing or retracting structural elements hereinafter further described.

As illustrated in FIGS. 1-5, a pair of locking hinges 46 are mounted to the respective connection plates 44 with one locking hinge 46 mounted to each connection plate 44. The locking hinges 46 are mounted to the connection plates 44 in any conventional manner and are capable of independent pivotal adjustable motion up to at least 90 degrees when the locking hinges 46 are disposed in the positions shown in FIGS. 2 and 5.

Figure 3:
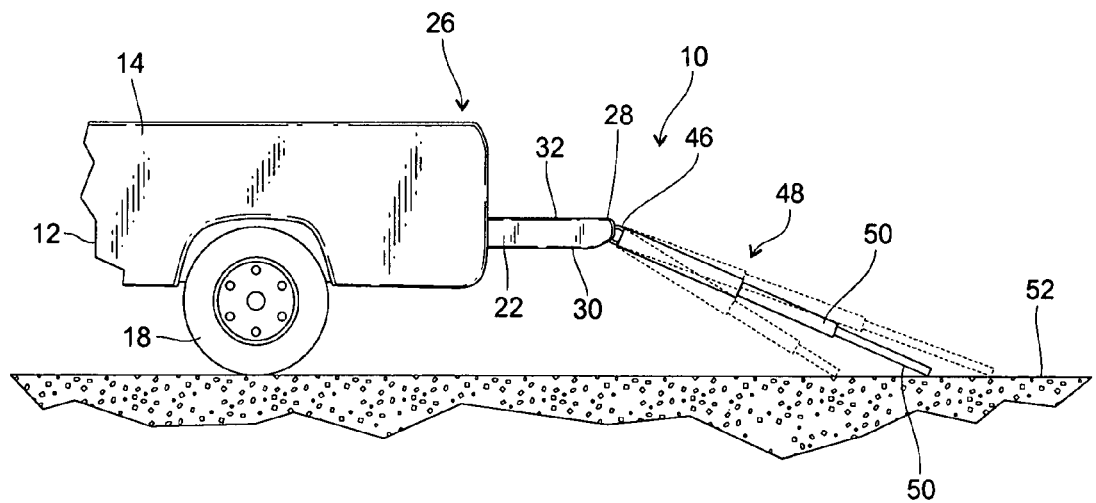
FIG. 3 is a side elevational view of the compact ramp assembly for a vehicle tailgate illustrating the tailgate in the open position and the various angular orientations to which the ramp assembly can be pivoted for use.

Secured to each locking hinge 46 is a telescoping ramp 48, and each ramp 48 telescopes (extends for use and retracts or withdraws during non-use and storage) independently of the other ramp 48. Each ramp 48 is further comprised of several ramp members 50 that are nestable within each other and extensible from each other. The ramp members 50 for each ramp 48 can be further delineated by designating the ramp members 50 as a first largest ramp member which is the ramp member 50 immediately and pivotally secured to the respective locking hinge 46, a second intermediate size ramp member, and a third smallest size ramp member. The third ramp member is the ramp member 50 that actually contacts the ground surface 52, as shown in FIG. 3, when the ramps 48 are disposed for loading and off-loading of equipment on and off the bed 20 of the vehicle 12. Each ramp member 50 includes a flat track support 54 and a pair of opposed hollow tubular receivers 56 with the tubular receivers 56 sized so that the receivers 56 of the ramp member 50 denoted the third smallest ramp member are slidably insertable into the receivers 56 of the ramp member 50 denoted the second ramp member, and the receivers 56 of the ramp member 50 denoted the second ramp member are slidably insertable into the receivers 56 of the ramp member 50 denoted the first largest ramp member thereby permitting the telescoping extension and retraction of the ramp members 50 to and from each other. The tubular receivers 56 of the ramp members 50 denoted the second and third ramp members include interior catches of any conventional design that delimit the extent of the extension from the adjacent ramp member 50 and which prevent the ramp members 50 denoted the second and third ramp members from completely disconnecting from the ramp members 50 denoted the first and second ramp members.

Figure 5:
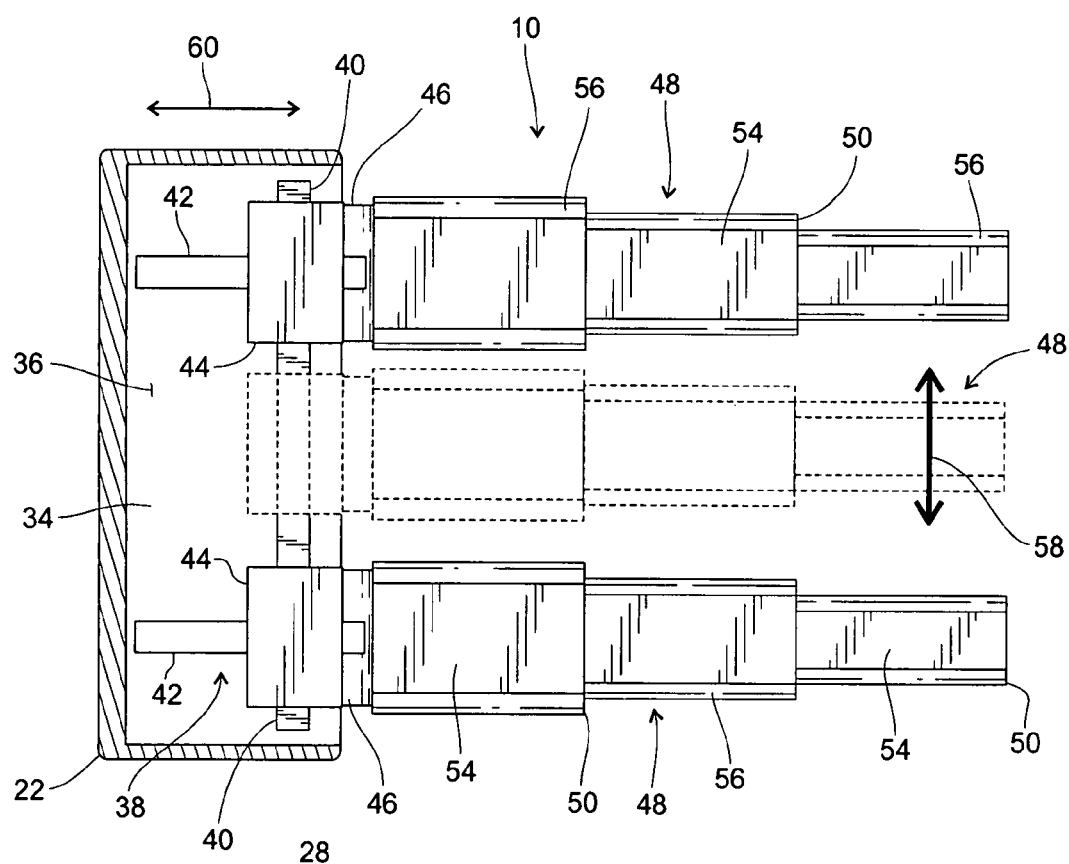
FIG. 5 is a top plan view of the compact ramp assembly for a vehicle tailgate illustrating the ramp members in their fully extended dispositions and also illustrating the slidable adjustable transverse movement of the ramp members to specifically align the ramp members with the equipment to be moved on and off the bed of the vehicle.

As shown in FIG. 5, each ramp 48 is adjoined to each respective connection plate 44 through the respective locking hinge 46. Thus, the ramps 48 are adjustable in the transverse direction or orientation as well as in the longitudinal orientation as shown by the transverse arrow 58 and the longitudinal arrow 60. When the ramps 48 are adjusted in the transverse direction the connection plates 44 concomitantly slide within the transverse guide channel 40 to allow such transverse (side to side) adjustable movement of the ramps 48; and when the ramps 48 are slid in the longitudinal direction the connection plates 44 are first aligned with and then slid within the respective longitudinal guide channels 42 resulting in the concomitant longitudinal adjustable movement of the ramps 48 to allow such longitudinal adjustable movement of one or both ramps 48.

Figure 4:
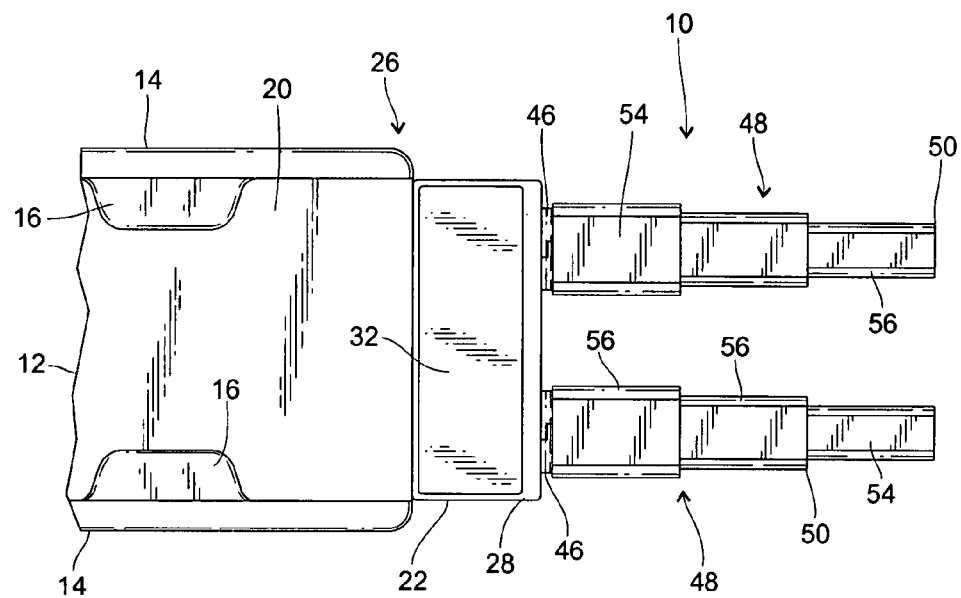
FIG. 4 is a top plan view of the compact ramp assembly for a vehicle tailgate illustrating each ramp member of the ramp assembly in their respective fully extended dispositions.

In operation the individual or moving party would first position the pickup truck 12 adjacent to the piece of aforementioned equipment or item to be loaded thereon. Next, the tailgate 22 would be opened thereby disposing the tailgate 22 parallel and flush with the bed 20 of the pickup truck 12. The ramps 48 would be adjusted in the transverse direction to accommodate the width of the equipment and to properly align the flat track supports 54 of the ramp members 50 with the wheels, rollers, casters, etc. of the equipment. Then the ramp members 50 would be telescopically extended or withdrawn from each other commencing with the extension of the ramp members 50 denoted the third smallest ramp members from the ramp members 50 denoted the second intermediate ramp members, and then the ramp members 50 denoted the second intermediate ramp members from the ramp members 50 denoted the first largest ramp members. The ramp members 50 for each ramp 48 would be adjusted and extended to the appropriate length, and thus would not necessarily be fully extended for every use as shown in FIGS. 3 and 4. In addition, to accommodate the particular ground surface, such as ground surface 52, the ramps 48 would be pivoted by the locking hinges 46 to meet and contact the ground surface 52 at the desired and best angle or inclination. Some of the various pivotal angles and inclinations that the ramps 48 could be positioned at are shown in FIG. 3. The equipment would then be pushed or rolled up the ramp members 50 of each ramp 48 for placement on the bed 20 of the pickup truck 12. After securing the piece of equipment, the ramp members 50 would be slidably retracted one within another commencing with the ramp members 50 denoted the third ramp members being telescopically retracted within the ramp members 50 denoted the second ramp members, and then the ramp members 50 denoted the second ramp members being telescopically retracted within the ramp members 50 denoted the first ramp members. The ramps 48 and the corresponding connection plates 44 would be aligned with the respective longitudinal guide channels 42, and then the ramps 48, with the several ramp members 50 fully retracted and nested within each other, would be pushed back and withdrawn into the interior hollow cavity 34 of the tailgate 22, as shown in FIG. 1, to the non-use position for storage until needed for unloading the piece of equipment. When the ramps 48 are fully retracted within the tailgate 22 only the ends of the ramp members 50 denoted the third smallest ramp members of each ramp 48 would be externally visible. Unloading the piece of equipment from the bed 20 of the pickup truck 12 would comprise the same aforedescribed steps.

A preferred embodiment of the invention has been disclosed herein, and it should be understood that numerous modifications, alterations, and various are possible and practicable to those skilled in the art while still coming within the ambit and spirit of the invention and the scope of the invention as set forth by the appended claims.

I claim:

1. A compact ramp assembly for a tailgate of a pickup truck for loading and unloading equipment on and off the bed of the pickup truck, comprising:

a hollow interior cavity formed within the tailgate;

a unitary guide track disposed within the hollow interior cavity and mounted to the tailgate;

the unitary guide track further including a transverse guide channel and a pair of longitudinal guide channels with the longitudinal guide channels connected to the transverse guide channel;

a pair of connection plates mounted to the unitary guide track and capable of slidable adjustable movement along the transverse guide channel and the longitudinal guide channels;

a pair of locking hinges with one locking hinge attached to each connection plate and each locking hinge capable of independent pivotal motion with respect to the other locking hinge;

the locking hinges capable of pivoting between zero and 90 degrees;

a pair of ramps with each ramp secured to each respective locking hinge and the ramps pivoting concomitant with the pivotable motion of the locking hinges;

each ramp including at least three ramp members with the ramp members being telescopically extensible and retractable with respect to each other; and whereupon opening the tailgate allows the ramps to be extended so that the locking hinges and the ramps can pivot and the ramp members can telescopically extend for contacting the ground surface whereby the equipment is positioned on the ramp members and directed up the ramp members for loading the equipment on the bed of the pickup truck and the equipment is directed down the ramp members for unloading off the bed of the pickup truck.

2. The compact ramp assembly of claim 1 wherein the ramps are contained within the hollow interior cavity of the tailgate when the ramps are in the retracted and non-use disposition.

3. The compact ramp assembly of claim 2 wherein each ramp member includes a flat track support and a pair of opposed hollow tubular receivers.

4. The compact ramp assembly of claim 3 wherein the ramps are independently adjustable transverse to the bed of the pickup truck.

5. The compact ramp assembly of claim 4 wherein the ramps are independently extendable and retractable with respect to each other.

* * * * *